United States Patent [19]

Sakakiyama

[11] Patent Number: 4,674,611

[45] Date of Patent: Jun. 23, 1987

[54] SYSTEM FOR CONTROLLING THE CLUTCH CURRENT OF AN ELECTROMAGNETIC CLUTCH FOR VEHICLES

[75] Inventor: Ryuzo Sakakiyama, Tokyo, Japan

[73] Assignee: Fuji Jukogyo Kabushiki Kaisha, Tokyo, Japan

[21] Appl. No.: 685,281

[22] Filed: Dec. 24, 1984

[30] Foreign Application Priority Data

Dec. 27, 1983 [JP] Japan .................. 58-251025

[51] Int. Cl.⁴ .............. B60K 41/22; B60K 41/02; F16D 37/02
[52] U.S. Cl. .................. 192/3.56; 192/0.076; 192/3.62; 192/21.5
[58] Field of Search ............ 192/0.07, 0.075, 0.076, 192/0.096, 21.5, 3.56, 3.61, 3.62, 3.63

[56] References Cited

U.S. PATENT DOCUMENTS

| 3,094,202 | 6/1963 | Issler ............... | 192/3.56 |
| 3,134,470 | 5/1964 | Weis et al. ............ | 192/3.56 |
| 4,449,619 | 5/1984 | Sakakiyama ............ | 192/0.052 |
| 4,484,672 | 11/1984 | Takano et al. ............ | 192/3.56 |
| 4,494,639 | 1/1985 | Takano et al. ............ | 192/0.052 |

FOREIGN PATENT DOCUMENTS

| 15023 | 1/1982 | Japan ............... | 192/3.63 |
| 30559 | 2/1983 | Japan ............... | 192/3.63 |

Primary Examiner—Rodney H. Bonck
Assistant Examiner—David A. Testardi
Attorney, Agent, or Firm—Martin A. Farber

[57] ABSTRACT

A system for controlling the clutch current of an electromagnetic clutch for a vehicle which has a transmission and a gear shift lever for changing change-speed gears in the transmission. A shift lever switch is operated when the shift lever is operated passing through a neutral position. A logic gate circuit is provided to respond to a signal of the shift lever switch for cutting off the clutch current. A timer is responsive to the disappearance of the signal upon engagement of the gears for producing an output with a delay, for opening the logic gate circuit, whereby the cluch remains disengaged for a predetermined period after engagement of the gears.

6 Claims, 1 Drawing Figure

SYSTEM FOR CONTROLLING THE CLUTCH CURRENT OF AN ELECTROMAGNETIC CLUTCH FOR VEHICLES

BACKGROUND OF THE INVENTION

The present invention relates to a system for controlling the clutch current of an electromagnetic clutch disposed between a crankshaft of an engine and a transmission of a motor vehicle.

Clutch current flowing in a coil of the electromagnetic clutch increases with an increase of the engine speed for starting the vehicle. When vehicle speed exceeds a predetermined speed (for example 20 km/h), a lock-up current flows through the coil, so that the clutch is entirely engaged.

Change speed gears in the transmission can be manually changed by cutting off the clutch current. Accordingly, a vehicle provided with such an electromagnetic clutch is not provided with a clutch pedal. For cutting off of the clutch current, a shift lever switch is attached on a gear shift lever and a neutral switch which is closed at a neutral position of the gear shift lever is also provided. When the shift lever switch is manually operated and the gear shift lever is operated for changing gears, the clutch current is cut off during the operation of the lever.

In such a system, if the shift lever switch is not properly operated during the change-speed operation, which is usually caused by incorrect or insufficient manipulation by the driver, the gears can not be changed because of the engagement of the clutch.

SUMMARY OF THE INVENTION

The object of the present invention is to provide a system enabling speed change without a shift lever switch, whereby the change-speed operation can be easily and surely carried out.

According to the present invention, there is provided a system for controlling the clutch current of an electromagnetic clutch for a vehicle having a transmission and a shift lever for changing speed gears in the transmission. The system comprises a neutral switch for producing a first signal when the shift lever reaches a neutral position of operation of the shift lever and causing said first signal to disappear upon engagement of the gears. The system further comprises a timer responsive to the disappearance of the first signal for producing a second signal with a delay, and gate means responsive to the first signal for cutting off the clutch current and responsive to the second signal for allowing the clutch current to flow, whereby the clutch remains disengaged for a predetermined period after engagement of the gears.

In another aspect of the present invention the gate means comprises logical gates and a transistor responsive to a signal from one of the logical gates for allowing the clutch current to flow.

The other objects and features of this invention will become understood from the following description with reference to the accompanying drawings.

DETAILED DESCRIPTION OF THE PREFERRED EMBODIMENT

Figure 1:
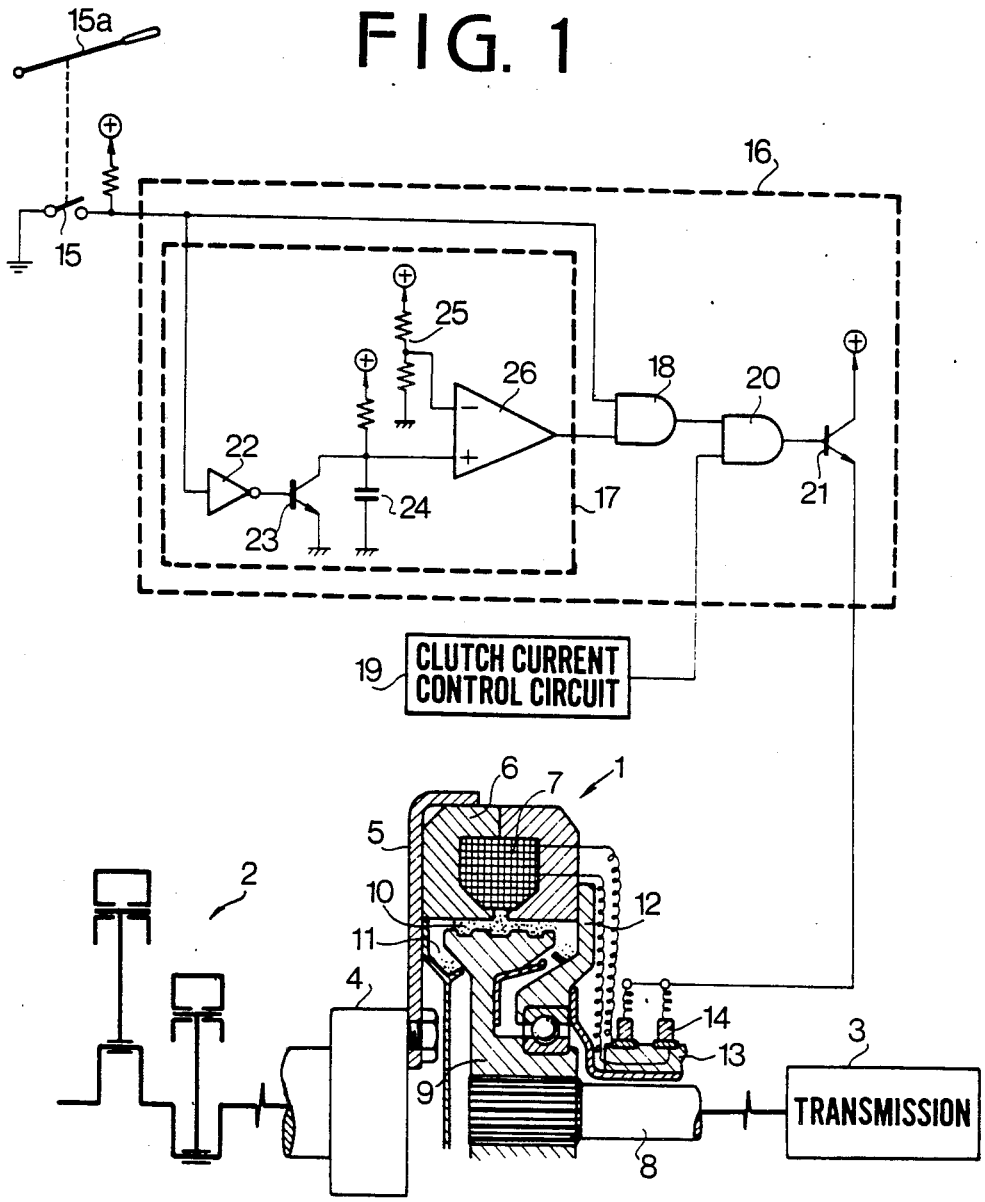
FIG. 1 is a schematic diagram showing a system of the present invention.

Referring to FIG. 1, an electromagnetic powder clutch 1 is provided for transmitting the power of an engine 2 to wheels (not shown) of a vehicle through a manually operated transmission or a belt-drive infinitely variable transmission 3. The electromagnetic powder clutch 1 comprises a drive member 6 connected to a crankshaft 4 of the engine 2 through a drive plate 5, a coil 6 provided in the drive member 6, a driven member 9 having its outer periphery spaced from the inner periphery of the drive member 6 by a gap 10, and a powder chamber 11 defined between the drive member 7 and driven member 9. The powder chamber 11 is filled with magnetic powder. The driven member 9 is secured to an input shaft 8 of the belt-drive transmission 3. A holder 12 secured to the drive member 6 carries slip rings 13 which are electrically connected to the coil 7. The coil 6 is supplied through brushes 14 and slip rings 13 with a control current from a control circuit 16.

When the magnetizing coil 7 is excited by the clutch current, drive member 6 is magnetized to produce a magnetic flux passing through the driven member 9. The magnetic powder is aggregated in the gap 10 by the magnetic flux and the driven member 9 is engaged with the drive member 6 by the powder. On the other hand, when the clutch current is cut off, the drive and driven members 6 and 9 are disengaged from one another.

The transmission ratio of the transmission 3 is determined in dependency on engine speed and vehicle speed. When the vehicle speed is lower than a predetermined low speed, the transmission ratio is at the highest ratio.

The system of the present invention is provided with a neutral switch 15 which is closed at the neutral position of a shift lever 15a of the transmission 3. Instead of the neutral switch, a gear position switch which is opened when any gear engages with another gear may be provided. When the neutral switch 15 is closed at the neutral position, a low level signal is applied to a timer 17 and an AND gate 18 of the control circuit 16. The timer 17 comprises an inverter 22 applied with the output signal of the neutral switch 15, transistor 23 connected to the output terminal of the inverter 22, capacitor 24 connected between the collector of the transistor and the ground, and comparator 26 for comparing the voltage at the capacitor 24 with a reference value formed by a voltage divider 25. The output of the comparator 26 is applied to the other input terminal of the AND gate 18. The output of the AND gate 18 is applied to an AND gate 20 together with an output signal of a clutch current control circuit 19. The output of the AND gate 20 is applied to a base of a transistor 21 to control the clutch current passing in the transistor.

In operation, when one of the gears in the transmission is in engagement with another gear, the neutral switch 15 is in open state. Accordingly, the output of the neutral switch is at a high level, causing a non-conductive state of the transistor 23 and a high voltage at the capacitor 24. Therefore, the output of the comparator is at a high level, so that the output of the AND gate 18 is at a high level. Thus, the AND gate 20 produces an output signal in accordance with the output of the clutch control circuit 19. The clutch current control circuit 19 is adapted to produce a pulse train, the duty ratio of which varies with engine speed. The output signal of the AND gate 20 renders the transistor 21 conductive, so that the clutch current flows through the coil 7 to engage the clutch.

When the shift lever 15a is shifted in order to disengage the interconnected gears and positioned at the neutral position or passes through the neutral position, the switch 15 is closed, causing the output thereof to go to a low level. The low level output causes AND gates 18 and 20 to immediately close, thereby cutting off the clutch current to disengage the clutch. Thus, other gears can be engaged by further shifting the shift lever 15a.

On the other hand, the transistor 23 in the timer 17 becomes conductive dependent on the high level output of the inverter 22, so that the voltage at the capacitor 24 is at a low level, and the output of comparator 26 is at a low level. Accordingly, although the output of the neutral switch 15 becomes high upon engagement of the gears, the clutch current does not flow to maintain the disengagement state of the clutch. At the opening of the switch 15, charging of the capacitor 24 begins, and when a predetermined time elapses, the voltage at the capacitor becomes larger than the reference voltage at the voltage divider 25. Thus, the output of the comparator 26 becomes high, causing the engagement of the clutch. The engagement of the clutch is controlled by the clutch current control circuit 19 so as to gradually engage the clutch. The delay time by the timer 17 is determined for a period necessary to perform the change-speed operation of the shift lever.

In accordance with the system of the present invention, the electromagnetic clutch is automatically disengaged for a proper time by the operation of the switch which is necessarily operated by the operation of the shift lever. Thus, the speed change of the transmission can be easily performed without operating a shift lever switch for disengaging the clutch. Further, the construction of the shift lever is simplified, since the shift lever switch is not provided on the shift lever.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. A system for controlling clutch current of an electromagnetic clutch for a vehicle having a transmission and a shift lever for changing change-speed gears in the transmission, wherein
   the shift lever is arranged so as to pass through a neutral position during operation of the shift lever during shifting to and from each of said change-speed gears;
   a neutral switch responsive to the operation of the shift lever reaching the neutral position for automatically producing a first signal when the shift lever reaches the neutral position and causing said first signal to disappear when the shift lever has passed the neutral position;
   timer means responsive to disappearance of the first signal for producing a second signal with a delay for a period which has been predetermined as necessary for performing the changing of the change-speed gears;
   gate means responsive to the first signal for cutting off the clutch current disengaging the clutch and responsive to the second signal for allowing the clutch current to flow, whereby the clutch remains disengaged for the predetermined period during the operation of the shift lever after the shift lever has passed the neutral position.

2. The system according to claim 1 wherein the gate means comprises logical gates and a transistor responsive to a signal from one of the logical gates for allowing the clutch current to flow.

3. The system according to claim 1 wherein the timer means comprises a capacitor, a transistor responsive to the first signal for controlling the charging and discharging of the capacitor, and a comparator for comparing the voltage at the capacitor with a reference voltage.

4. The system as set forth in claim 1, wherein
   said shift lever has no switch thereon,
   said neutral switch is disposed spaced apart from said shift lever.

5. The system as set forth in claim 1, wherein
   said gate means includes an AND gate having inputs connected to said neutral switch and to said timer means.

6. The system for controlling clutch current of an electromagnetic clutch for a vehicle according to claim 1, the system further comprising:
   clutch current control circuit means for producing a clutch engaging signal in response to the second signal from said timer means for gradually engaging the clutch.

* * * * *